Jan. 20, 1942.　　　　　N. T. TODD　　　　　2,270,745
SKATING RINK
Filed July 24, 1940　　　2 Sheets-Sheet 1

INVENTOR.
NEWTON TAYLOR TODD,
BY
ATTORNEYS.

Jan. 20, 1942.                N. T. TODD                2,270,745
                             SKATING RINK
                         Filed July 24, 1940            2 Sheets-Sheet 2
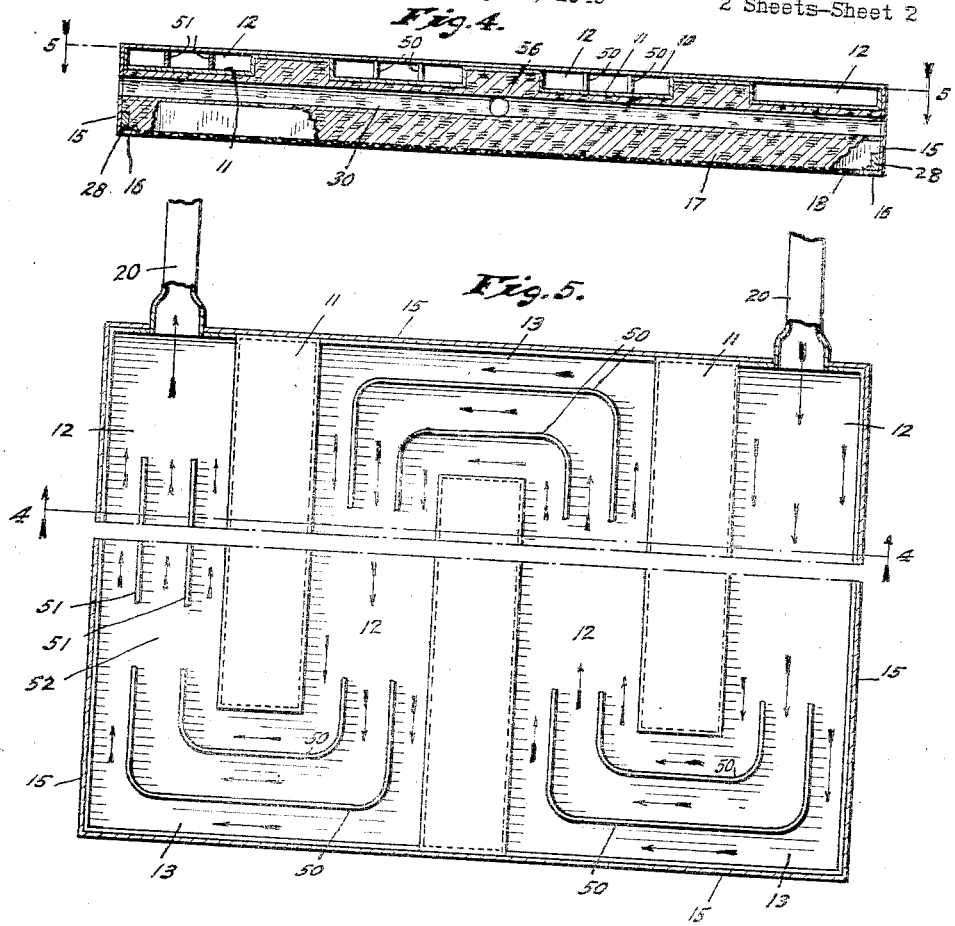
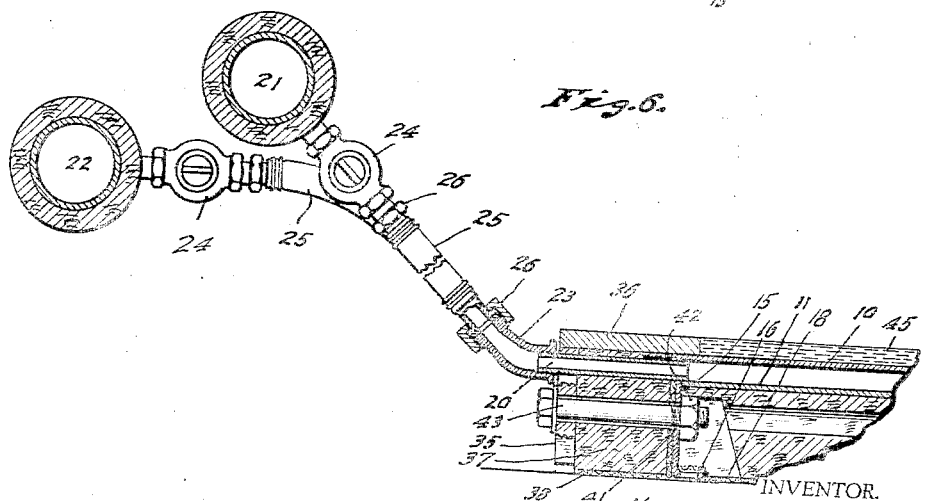
INVENTOR.
NEWTON TAYLOR TODD,
ATTORNEYS.

Patented Jan. 20, 1942

2,270,745

UNITED STATES PATENT OFFICE 2,270,745

SKATING RINK

Newton Taylor Todd, Indianapolis, Ind.

Application July 24, 1940, Serial No. 347,106

11 Claims. (Cl. 62—12)

It is the object of my invention to produce a portable ice-skating rink which can readily be taken apart, transported in sections, and expeditiously reassembled at a new location.

In carrying out my invention I form a rink of a plurality of horizontally disposed sheet-metal panels each of which is formed immediately beneath its upper surface with a channel for the circulation of brine or other cooling liquid. This channel is desirably retroverted and has both its ends located at one end of the panel, where nipples are provided for the purpose of connecting the ends of the channel respectively to brine-supply and brine-return headers. In setting up the rink, a plurality of the panels just described are placed side by side on a suitable supporting surface with their upper faces in substantially co-planar relationship, and are secured together by means of rods or cables which extend transversely of the panels throughout the entire extent of the assembly. A border frame is then applied to the panel-assembly, such border frame consisting of rails extending along the edges of the rink and overlapping the upper edges of the panels for a short distance to define and provide a support for the edges of ice-sheet to be formed on the upper surface of the assembled panels. Brine-supply and brine-return headers are then arranged along one end of the rink and connected, preferably through flexible hose, with the nipples on the individual rink-sections. As brine is circulated through the individual rink-sections, water sprayed upon the upper surface of the panels will be frozen to form a continuous, smooth sheet of ice.

Figure 1:
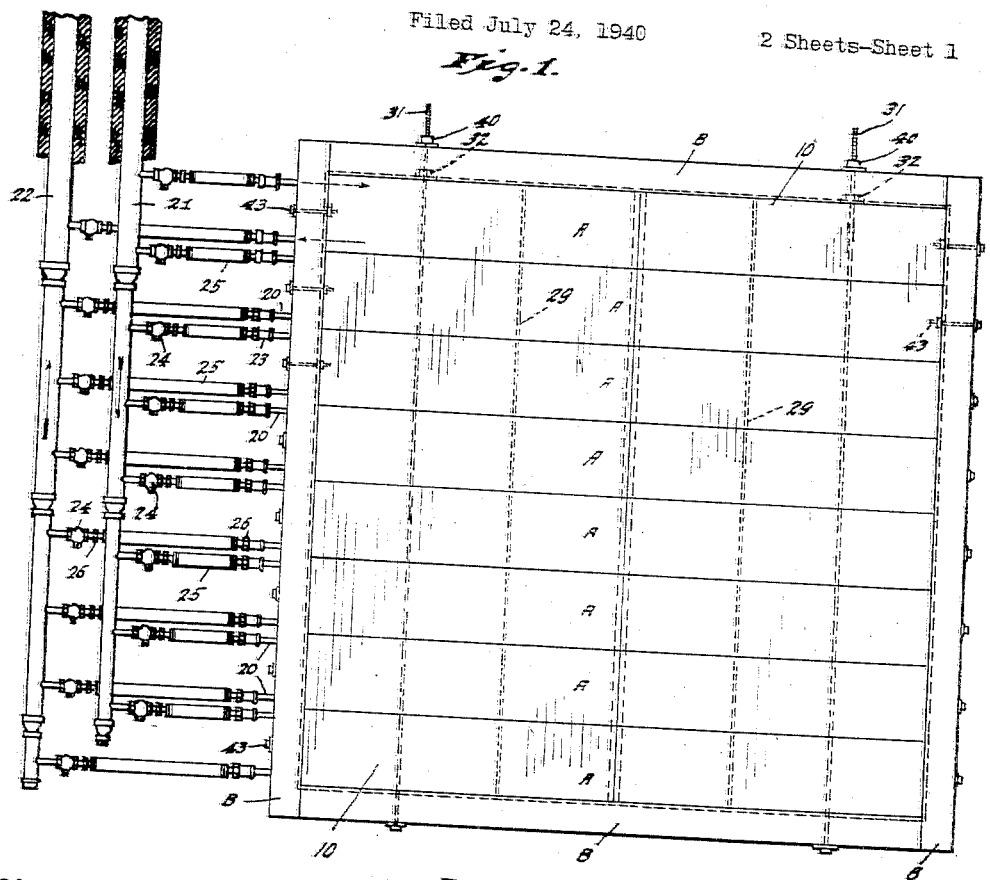
Figure 2:
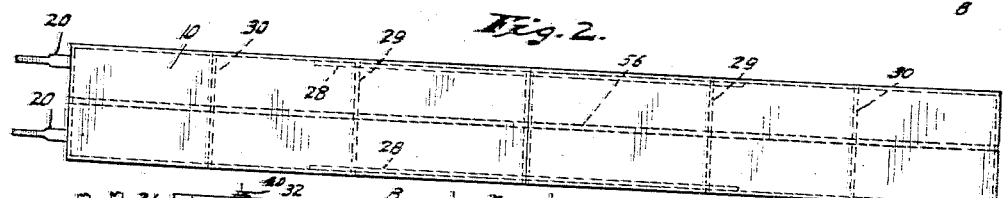
Figure 3:
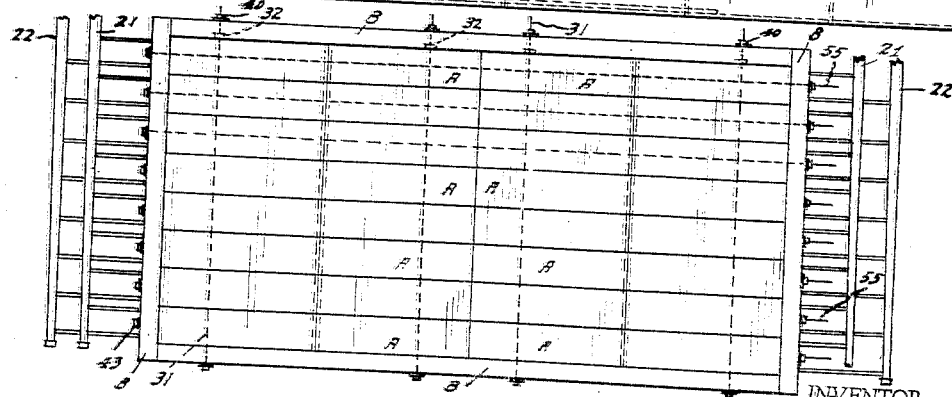

The accompanying drawings illustrate my invention: Fig. 1 is a plan view of a complete rink embodying a single row of panels; Fig. 2 is a plan view of a single panel; Fig. 3 is a plan view of a rink embodying a double row of panels; Fig. 4 is a transverse vertical section on the line 4—4 of Fig. 5 illustrating constructional details of the individual panels; Fig. 5 is a horizontal section on the line 5—5 of Fig. 4; and Fig. 6 is a fragmental vertical section through one end of a panel illustrating further details of construction.

As will be clear from Figs. 4, 5 and 6, each of the panels comprises an upper plate 10 and a lower plate 11, the latter being formed to provide an upwardly opening retroverted channel having a plurality of longitudinally extending stretches 12 interconnected in series by transverse stretches 13 at the ends of the plate. The upper plate 10 covers the open top of the retroverted channel 12—13 and, with the walls of that channel, defines a continuous passage extending back and forth throughout the entire length of the panel.

The side and end edges of the plate 10 are bent downwardly to form flanges 15 which extend well below the bottom wall of the channel 12—13, the inner surface of the flange 15 at the sides of the plate 10 desirably lying against the up-turned edges of the plate 11 which define the outer walls of the channel-stretches 12 at the sides of the plate 10. The extreme lower end of the flange 15 is bent inwardly to form a lip 16 which serves to retain in position heat-insulating material 17 with which each panel, below the channel 12—13, is filled. Any desired form of heat-insulation may be employed, but I prefer to use cork-slab insulation, protecting its lower face with a sheet 18 of canvas the edges of which are tucked beneath the lips 16, as will be clear from Fig. 6. The cork-slab insulation is held in place within the panel as by gluing, and may extend below the lower face of the lip 16 in order to support such lip above the floor or other supporting surface and thus reduce heat-transference.

Desirably, the channel 12—13 is formed so that its two ends are located at the same end of the panel formed by the two plates 10 and 11. At the ends of the channel, there are mounted in the flange 15 two nipples 20 adapted respectively for connection to a brine-supply header 21 and a brine-return header 22. Preferably, each of the nipples 20 is provided with a 45° street-L 23 arranged with its outer end inclined upwardly and connected to the associated header through a valve 24 and a short length of flexible hose 25 having at its ends couplings 26 for attachment respectively to the street-L 23 and the valve 24 on the header.

The two plates 10 and 11 are secured together, and the nipples 20 secured in place, as by welding. The ungrooved portions of the lower plate 11 should fit tightly against the lower surface of the plate 10, and are preferably welded thereto, in order to prevent cross-flow between two adjacent longitudinal stretches 12 of the brine channel. To reinforce each panel, I may employ stiffening rods 28 (Fig. 4) which extend at least for a considerable portion of the length of the panel and which are welded in place within the angle formed by the flange 15 and lip 16 at each side of the panel. If desired, one or more transverse tie rods 29 extending between and welded to opposite longitudinal flanges 15 may also be employed.

To assemble the rink a plurality of panels A are placed side by side on any suitable floor or other fairly plane supporting surface as indicated in Fig. 1, with the nipples 20 on all the panels disposed at the same end. To hold the panels together each of them is provided with a plurality of transverse holes 30 so located as to be alined when the panels are put in the assembled position; and rods, cables, or other tension members 31 are passed through the alined openings 30 of the several panels. As shown in Fig. 1, the tension members 31 are rods having screw-threaded ends on which nuts 32 are mounted for the purpose of clamping the panels together. After the panels are secured together the brine-supply and brine-discharge headers are mounted along that side of the assembly from which the nipples 20 project, and the hoses 25 then put in place to connect each panel to the supply and return headers.

To provide a support for the edges of the ice-sheet which is to be formed on the upper surfaces of the panel-plates 10, and also to stiffen the assembly, I prefer to employ a border B which surrounds the assembly at the edges thereof. As will be clear from Fig. 6, each side of this border is desirably formed of two strips of wood 35 and 36 secured together at right angles to each other with the inner edge of the horizontal strip 36 overlapping the upper surface of the plates 10. To provide additional heat insulation, the vertical strip 35 may be disposed outwardly from the panel and the intervening space filled with heat-insulating material 37. Conveniently, the two strips 35 and 36 and the insulating material are embodied in a sub-assembly, the insulating material being cork slab cut to the proper dimension, glued to the two strips 35 and 36 and protected by a strip of canvas 38.

Those rails of the border frame which extend longitudinally of the panels may be held in place by nuts 40 on the ends of the rods 31, such rod-ends projecting beyond the panel-clamping nuts 32 far enough to extend through the border-frame member 35. To hold the other two rails of the border frame B in place, the end wall 15 of each panel may be provided with an opening 41 for the reception of the nut 42 of a bolt 43, extending through the side rail of the border frame. In order to facilitate application of the border-frame side rail to that end of the rink from which the nipples 20 project, that side rail may be provided with downwardly opening nipple-receiving slots so that the rail can be put in place by a downward movement.

With the desired number of panels assembled in the manner above described and connected to the brine-supply and brine-return headers 21 and 22 brine is circulated through the passages 12—13 of the several panels to cool the same; and after the panels have become cold, water is sprayed on their upper surfaces to build up an ice-sheet 45 of appropriate thickness.

For obvious reasons, it is of considerable importance that the flow of brine or other cooling liquid through the several panels be reasonably uniform. To promote an even distribution of cooling fluid among the several panels, it is desirable to make each of the headers 21 and 22 of stepped diameter, the supply header 20 decreasing in diameter from its inlet and the return header increasing in diameter toward its outlet. In order to promote uniformity of flow within the passage 12—13 of each individual panel and to prevent the formation of eddies at the bends in such passage, I find it desirable to provide guide vanes 50 in each of the transverse stretches 13 of the passage in each panel. As will be clear from Fig. 5, each of these guide vanes is formed of a metal strip having a width equal to the depth of the passage 12—13 and bent into a general U-shape with its ends extending longitudinally of two adjacent longitudinal stretches 12 of the brine passage. The guide vanes 50 subdivide each transverse passage 13 and the adjacent ends of the two longitudinal passages 12 interconnected thereby, and the vanes are so shaped and positioned as to make the several passage sub-divisions as nearly as practicable of substantially equal cross-sectional area at corresponding points in their length. I find that in the absence of the guide-vanes 50 or of some similar flow-controlling means, eddies form at the outer corners of the bends in the passage 12—13 and tend to create warm spots in the upper surface of the plate 10. The vanes 50, however, act to prevent the formation of such eddies and therefore promote the maintenance of uniform temperatures over the surface of the upper plate 10.

Since the brine or other cooling liquid absorbs heat during its flow through the passage 12—13, the temperature of the cooling fluid in the last longitudinal stretch 12 of the passage in each panel will be somewhat higher than that in the first longitudinal stretch. To compensate at least partially for this temperature differential, I may mount in the last stretch of the passage one or more heat-radiating fins 51. Desirably, these fins are metal strips having a width equal to the depth of the passage 12—13 and are welded to the lower surface of the upper plate 10 to promote the flow of heat from the plate 10 through the fins into the cooling liquid. I prefer that the fins 51 be spaced from any flow-directing vanes 50, as indicated at 52 in Fig. 5, in order to equalize any pressure-differential which results from varying resistances to flow possessed by the sub-divisions into which the passage 13 is divided by the guide vanes 50.

If it is desired to build a rink having a width greater than the length of the panels A, two rows of such panels may be placed side by side as indicated in Fig. 3 with the nipple ends of the panels in the two rows directed away from each other so that the opposite ends of the panels in the two rows may abut closely together. The panels in each row are clamped together by the tension members 31 and nuts 32, while the two rows of panels are tied together by similar tension members 55 extending through longitudinal holes 56 in the individual panels. The transverse holes 30 and longitudinal holes 56 in each panel may be made co-planar and large enough so that the tension members 31 and 55 can cross at the points where the holes intersect. In the case of a rink embodying two rows of panels, the border frame B surrounds the entire assembly, its rails at the ends of the panels being held in place by nuts 40 on the ends of the tension members 55, and two sets of headers 21 and 22 are employed, one for each row of panels.

When it is desired to move the rink, the valves 24 are closed and the headers emptied of cooling fluid. The hoses are disconnected from the street-L's 23, but may be left in association with the headers. The outer end of the street-L's 23 will be disposed above the passage 12—13 in the panels, with the result that the cooling liquid will not escape from the panels and spill upon the floor or other supporting surface when the hoses are disconnected. This feature is of considerable advantage when the rink is set up on a finished wood floor.

Following disconnection of the hoses 25, the nuts 40 are removed and the border frame B disassembled. At least one of the clamping nuts 32 on each tension member 31 or 55 is then removed and the tension members withdrawn from the panels, thus permitting each panel to be handled and transported individually.

I claim as my invention:

1. A portable ice skating rink, comprising a plurality of horizontal panels; each of said panels including an elongated plane top plate of sheet-metal, a bottom plate of sheet metal formed with an upwardly opening retroverted channel and received beneath said top plate whereby the lower surface of the top plate and the walls of said channel define a continuous retroverted fluid passage, the side and end edges of said top plate being bent to form flanges extending downwardly past the bottom wall of said passage, and heat-insulating material substantially filling the space between the bottom plate and the lower edges of said flanges; means for holding said panels together with their upper surfaces coplanar and the flanges at the sides of successive panels abutting; supply and return headers for a cooling fluid; means for connecting the ends of the passage in each panel to said headers, respectively; and a border frame surrounding said row of panels, said border frame including a member overlying the upper surfaces of the panels at the edges of the panel row to define the edges of an ice-sheet formed by water sprayed on the coplanar upper surfaces of said panels and frozen by cooling fluid circulated through said passages.

2. A portable ice skating rink, comprising a plurality of horizontal panels; each of said panels including an elongated plane top plate of sheet-metal, a bottom plate of sheet metal formed with an upwardly opening retroverted channel and received beneath said top plate whereby the lower surface of the top plate and the walls of said channel define a continuous retroverted fluid passage, the side and end edges of said top plate being bent to form flanges extending downwardly past the bottom wall of said passage, and heat-insulating material substantially filling the space between the bottom plate and the lower edges of said flanges; means for holding said panels together with their upper surfaces coplanar and the flanges at the sides of successive panels abutting; supply and return headers for a cooling fluid; and means for connecting the ends of the passage in each panel to said headers, respectively.

3. The invention set forth in claim 2 with the addition that said heat-insulating material extends downwardly beyond the lower edges of said flanges.

4. The invention set forth in claim 2 with the addition that the lower edges of said flanges are turned inwardly of the panel to form lips overlying the edges of said insulating material.

5. The invention set forth in claim 2 with the addition that said panels are provided with alined holes extending transversely of the panels and longitudinally of the row, said means for holding the panels together comprising tension members extending through said holes.

6. A portable ice skating rink, comprising a plurality of horizontal panels, each of said panels including a plane top plate of sheet-metal, means including passage-defining walls rigid with the top plate of each panel for circulating a cooling fluid in contact with the lower surface of such top plate, and means for detachably holding said panels together in a row with their side edges abutting and the upper surfaces of said top plates in substantially coplanar relationship to form a support for a sheet of ice formed by water sprayed on such top plates and frozen by cooling fluid in contact with the lower surfaces thereof.

7. The invention set forth in claim 6 with the addition that the means for holding said panels together comprises one or more tension members extending transversely through each panel and longitudinally of the panel-row.

8. The invention set forth in claim 6 with the addition of a border frame surrounding the row of panels and including a member overlying the upper surfaces of the panels to define the edges of such ice-sheet.

9. A portable ice-skating rink, comprising a sectional, horizontal, ice-supporting wall, means for circulating a cooling fluid beneath the several sections of said wall and in heat-exchanging relation thereto, and means for detachably holding the wall-sections together, each section of said ice-supporting wall including a conduit disposed in heat-transferring relation with the wall-section and forming a part of said circulating means.

10. In a portable ice-skating rink, a plurality of elongated panels each having a plane, horizontal top wall, means co-operating with the top wall of each panel to define therebeneath a continuous retroverted passage for cooling fluid, parallel conduits for the supply and return of cooling fluid, the retroverted fluid passage in each of said panels having its ends located at the same end of the panel and the several panels being arranged in a row parallel to said conduits and with the passage-ends of each panel adjacent thereto, and severable, flexible connections connecting the ends of the fluid-passage in each panel respectively with said two conduits.

11. In a portable ice-skating rink, a plurality of elongated panels each having a plane, horizontal top wall, means co-operating with the top wall of each panel to define therebeneath a continuous retroverted passage for cooling fluid, said passage having a plurality of parallel longitudinal stretches interconnected in series by one or more transverse stretches at the ends of the panel, guide vanes disposed in said passage at each junction of longitudinal and transverse passage-stretches to prevent the formation of eddies in cooling fluid flowing through the passage, and means for supplying cooling fluid to one end of the passage in each panel.

NEWTON TAYLOR TODD.